(12) United States Patent
Xiong et al.

(10) Patent No.: US 11,670,063 B2
(45) Date of Patent: Jun. 6, 2023

(54) SYSTEM AND METHOD FOR DEPTH MAP GUIDED IMAGE HOLE FILLING

(71) Applicant: SAMSUNG ELECTRONICS CO., LTD., Suwon-si (KR)

(72) Inventors: Yingen Xiong, Mountain View, CA (US); Christopher A. Peri, Mountain View, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/463,037

(22) Filed: Aug. 31, 2021

(65) Prior Publication Data

US 2022/0165041 A1    May 26, 2022

Related U.S. Application Data

(60) Provisional application No. 63/116,666, filed on Nov. 20, 2020.

(51) Int. Cl.
*G06T 19/20* (2011.01)
*G06T 5/00* (2006.01)

(52) U.S. Cl.
CPC ............ *G06T 19/20* (2013.01); *G06T 5/005* (2013.01); *G06T 2207/10024* (2013.01); *G06T 2207/20221* (2013.01); *G06T 2219/2012* (2013.01)

(58) Field of Classification Search
CPC .............................. G06T 19/20; G06T 5/005
USPC .......................................................... 345/419
See application file for complete search history.

(56) References Cited

U.S. PATENT DOCUMENTS

| 9,311,688 B1 | 4/2016 | Rosenberg et al. |
| 9,626,760 B2 | 4/2017 | Narahari et al. |
| 9,824,486 B2 | 11/2017 | Hu et al. |
| 9,898,856 B2 | 2/2018 | Yang et al. |

(Continued)

FOREIGN PATENT DOCUMENTS

| EP | 3405929 A1 | 11/2018 |
| JP | 2020-191061 A | 11/2020 |

(Continued)

OTHER PUBLICATIONS

Guibo Luo et al., "A Hole Filling Approach Based on Background Reconstruction for View Synthesis in 3D Video", In Proceedings of the 2016 IEEE Conference on Computer Vision and Pattern Recognition (CVPR), pp. 1781-1789, Jun. 2016, IEEE, United States.

(Continued)

*Primary Examiner* — Thomas J Lett
(74) *Attorney, Agent, or Firm* — Sherman IP LLP; Kenneth L. Sherman; Steven Laut (57) ABSTRACT

An electronic device that reprojects two-dimensional (2D) images to three-dimensional (3D) images includes a memory configured to store instructions, and a processor configured to execute the instructions to: propagate an intensity for at least one pixel of an image based on a depth guide of neighboring pixels of the at least one pixel, wherein the at least one pixel is considered a hole during 2D to 3D image reprojection; propagate a color for the at least one pixel based on an intensity guide of the neighboring pixels of the at least one pixel; and compute at least one weight for the at least one pixel based on the intensity and color propagation.

20 Claims, 7 Drawing Sheets

(56) References Cited

U.S. PATENT DOCUMENTS

| | | | |
|---|---|---|---|
| 10,489,970 B2 | 11/2019 | Iverson et al. | |
| 10,614,337 B2 | 4/2020 | Gu et al. | |
| 2003/0076423 A1* | 4/2003 | Dolgoff | H04N 13/305 |
| | | | 348/E13.058 |
| 2012/0120192 A1 | 5/2012 | Alregib et al. | |
| 2012/0262542 A1* | 10/2012 | Veera | G06T 5/005 |
| | | | 348/E13.001 |
| 2015/0049937 A1 | 2/2015 | Choi et al. | |
| 2020/0283102 A1 | 9/2020 | Um et al. | |
| 2020/0372700 A1 | 11/2020 | Davies | |
| 2021/0142497 A1* | 5/2021 | Pugh | G06T 7/543 |
| 2021/0233312 A1* | 7/2021 | Noris | G06F 3/011 |

FOREIGN PATENT DOCUMENTS

| | | |
|---|---|---|
| KR | 10-1458986 B1 | 11/2014 |
| KR | 10-1590114 | 1/2016 |
| KR | 10-2113812 | 5/2020 |
| WO | 2017-127198 A1 | 7/2017 |

OTHER PUBLICATIONS

International Search Report & Written Opinion dated Feb. 17, 2022 for International Application PCT/KR2021/016069 from Korean Intellectual Property Office, pp. 1-8, Republic of Korea.

Perez, E., et al., "A Comparison of Hole-Filling Methods in 3D", Int. J. Appl. Math. Comput. Sci., 2016, pp. 885-903, vol. 26, No. 4.

Salmanca, S. et al., "Filling Holes in 3D Meshes using Image Restoration Algorithms", Proceedings of 3DPVT'08 —the Fourth International Symposium on 3D Data Processing, Visualization and Transmission, Jun. 18 -20, 2008, pp. 1-8, Georgia Institute of Technology, Atlanta, GA, USA.

* cited by examiner

SYSTEM AND METHOD FOR DEPTH MAP GUIDED IMAGE HOLE FILLING

CROSS-REFERENCE TO RELATED APPLICATIONS

This application claims the priority benefit of U.S. Provisional Patent Application No. 63/116,666, filed on Nov. 20, 2020, which is incorporated herein by reference in its entirety.

COPYRIGHT DISCLAIMER

A portion of the disclosure of this patent document may contain material that is subject to copyright protection. The copyright owner has no objection to the facsimile reproduction by anyone of the patent document or the patent disclosure as it appears in the patent and trademark office patent file or records, but otherwise reserves all copyright rights whatsoever.

TECHNICAL FIELD

One or more embodiments relate generally to image hole filling, and in particular, to depth map guided image hole filling for reprojection of two-dimensional (2D) images to three-dimensional (3D) images.

BACKGROUND

Extended reality (XR) devices, especially augmented reality (AR) head-mounted display (HMD) devices with wireless companion devices, are becoming smaller and smaller, reducing computational power, battery size, and the heat dissipation area. At the same time, field of view (FOV) and resolution are increasing. This is creating a difficult problem in product design to make form factors smaller, yet maintain or increase performance. A solution is needed to reduce as much power consumption on the device as possible in order to reduce battery and heat on smaller computer platforms.

SUMMARY

One or more embodiments relate to depth map guided image hole filling for reprojection of two-dimensional (2D) images to three-dimensional (3D) images. In one embodiment, an electronic device reprojects 2D images to 3D images and includes a memory configured to store instructions, and a processor configured to execute the instructions to: propagate an intensity for at least one pixel of an image based on a depth guide of neighboring pixels of the at least one pixel, wherein the at least one pixel is considered a hole during 2D to 3D image reprojection; propagate a color for the at least one pixel based on an intensity guide of the neighboring pixels of the at least one pixel; and compute at least one weight for the at least one pixel based on the intensity and color propagation.

In another embodiment, a method of using a computing device that reprojects 2D images to 3D images includes: propagating, by the computing device, an intensity for at least one pixel of an image based on a depth guide of neighboring pixels of the at least one pixel, wherein the at least one pixel is considered a hole during 2D to 3D image reprojection; propagating, by the computing device, a color for the at least one pixel based on an intensity guide of the neighboring pixels of the at least one pixel; and computing, by the computing device, at least one weight for the at least one pixel based on the intensity and color propagation.

In one embodiment, a non-transitory processor-readable medium that includes a program that when executed by a processor performing a method includes: propagating an intensity for at least one pixel of an image based on a depth guide of neighboring pixels of the at least one pixel, wherein the at least one pixel is considered a hole during 2D to 3Ds image reprojection; propagating a color for the at least one pixel based on an intensity guide of the neighboring pixels of the at least one pixel; and computing at least one weight for the at least one pixel based on the intensity and color propagation.

These and other features, aspects and advantages of the one or more embodiments will become understood with reference to the following description, appended claims and accompanying figures.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate to depth map guided image hole filling for reprojection of 2D images to 3D images. In one embodiment, an electronic device reprojects 2D images to 3D images and includes a memory configured to store instructions, and a processor configured to execute the instructions to: propagate an intensity for at least one pixel of an image based on a depth guide of neighboring pixels of the at least one pixel, wherein the at least one pixel is considered a hole during 2D to 3D image reprojection; propagate a color for the at least one pixel based on an intensity guide of the neighboring pixels of the at least one pixel; and compute at least one weight for the at least one pixel based on the intensity and color propagation.

In some embodiments, to reduce as much power consumption on electronic devices (e.g., XR devices, AR devices, HMDs with wireless companion devices, etc.) is to re-project or 'warp' an image that was created at one point in time, to reflect the six degrees of freedom (6 DOF) pose change of the AR device at the most recent time. The re-projection is based on depth information and as such, some information at the new point of view of the user, will be lacking image information. To resolve this issue, information from neighboring pixels is used to estimate what the pixels would be to complete the missing information or 'fill the holes' created by the re-projection. The embodiments improve visual quality of output images generated by re-projecting 2D images to 3D space with hole filling.

Hereinafter, embodiments of the present disclosure are described with reference to the accompanying drawings. However, it should be appreciated that the present disclosure is not limited to the embodiments, and all changes and/or equivalents or replacements thereto also belong to the scope of the present disclosure. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

According to some embodiments, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, APPLE TV®, or Google TV™), a gaming console (XBOX®, PLAYSTATION®), an electronic dictionary, an electronic key, a camcorder, an electronic picture frame, etc.

According to some embodiments, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automatic teller's machines (ATMs), point of sales (POS) devices, or Internet of Things (IoT) devices (e.g., a light bulb, various sensors, an electric or gas meter, a sprinkler, a fire alarm, a thermostat, a streetlight, a toaster, fitness equipment, a hot water tank, a heater, a boiler, etc.).

According to one or more embodiments, examples of the electronic device may at least include one part of a piece of furniture or building/structure, an electronic board, an electronic signature receiving device, a projector, or various measurement devices (e.g., devices for measuring water, electricity, gas, or electromagnetic waves).

According to some embodiments, the electronic device may be one or a combination of the above-listed devices. The electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present disclosure. As used herein, the term "user" may denote a human or another device (e.g., an artificial intelligent electronic device) using the electronic device. Examples of the electronic device according some embodiments may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, an HMD, electronic clothes, an electronic bracelet, an electronic necklace, an electronic pendant, an electronic appcessory, an electronic tattoo, a smart mirror, a smart watch, etc.).

Figure 1:
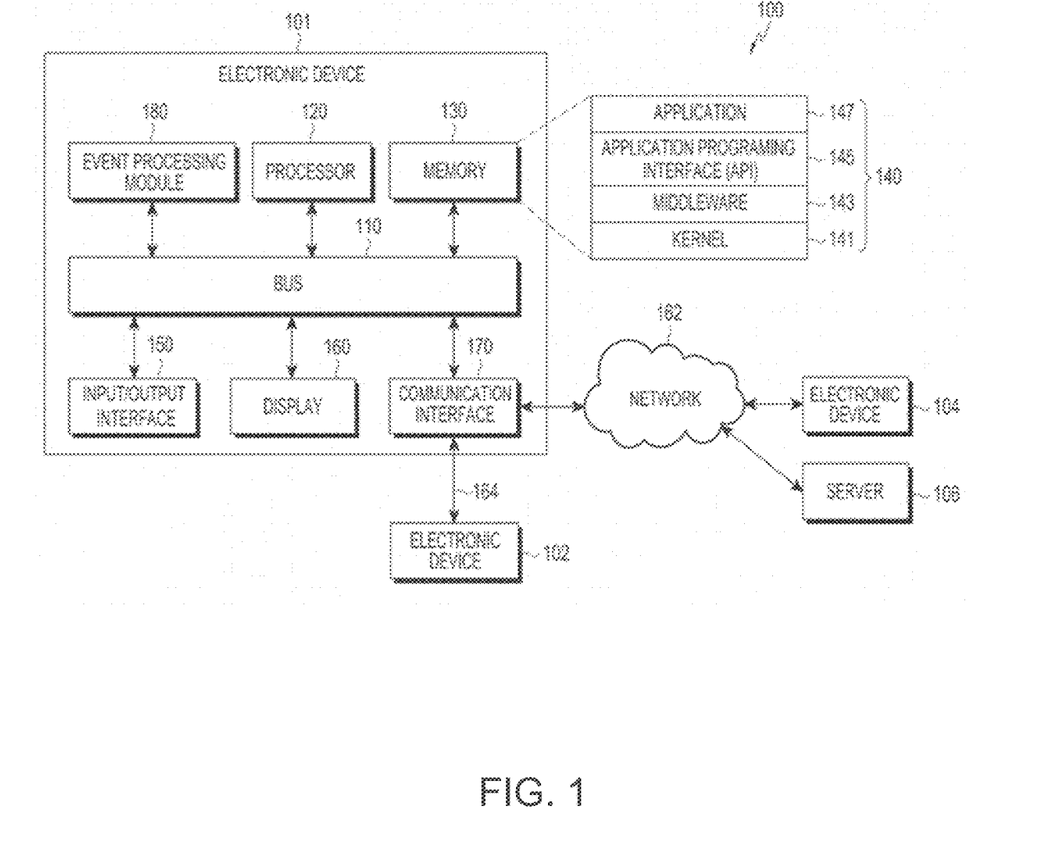
FIG. 1 illustrates an exemplary network configuration, according to some embodiments.

FIG. 1 illustrates an exemplary network configuration, according to some embodiments. Referring to FIG. 1, according to one or more embodiments, an electronic device 101 is included in a network environment 100. The electronic device 101 may include at least one of a bus 110, a processor 120, a memory 130, an input/output interface 150, a display 160, a communication interface 170, or an event processing module 180. In some embodiments, the electronic device 101 may exclude at least one of the components or may add at least one other component.

In some embodiments, the bus 110 may include a circuit for connecting the components 120-180 with one another and transferring communications (e.g., control messages and/or data) between the components.

In one or more embodiments, the processing module 120 may include one or more of a central processing unit (CPU), an application processor (AP), or a communication processor (CP). The processor 120 may perform control on at least one of the other components of the electronic device 101, and/or perform an operation or data processing relating to communication.

In some embodiments, the memory 130 may include a volatile and/or non-volatile memory. For example, the memory 130 may store commands or data related to at least one other component of the electronic device 101. According to one or more embodiments, the memory 130 may store software and/or a program 140. The program 140 may include, for example, a kernel 141, middleware 143, an application programming interface (API) 145, and/or an application program (or "application") 147. At least a portion of the kernel 141, middleware 143, or API 145 may be denoted as an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

In one or more embodiments, the middleware 143 may function, for example, as a relay to allow the API 145 or the application 147 to communicate data with the kernel 141. A plurality of applications 147 may be provided. The middleware 143 may control work requests received from the application 147, for example, by allocation of the priority of using the system resources of the electronic device 101 (e.g., the bus 110, the processor 120, or the memory 130) to at least one of the plurality of applications 147.

In some embodiments, the API 145 is an interface allowing one or more of the applications 147 to control functions provided from the kernel 141 or the middleware 143. For example, the API 145 may include at least one interface or function (e.g., a command) for filing control, window control, image processing or text control.

In one or more embodiments, the input/output interface 150 may serve as an interface that may, for example, transfer commands or data input from a user or other external devices to other component(s) of the electronic device 101. Further, the input/output interface 150 may output commands or data received from other component(s) of the electronic device 101 to the user or the other external device.

In some embodiments, the display 160 may include, for example, a liquid crystal display (LCD), a light emitting diode (LED) display, an organic light emitting diode (OLED) display, a microelectromechanical systems (MEMS) display, or an electronic paper display. The display 160 may display, for example, various contents (e.g., text, images, videos, icons, symbols, etc.) to the user. The display 160 may include a touchscreen and may receive, for example, a touch, gesture, proximity or hovering input using an electronic pen or a body portion of the user.

In one or more embodiments, the communication interface 170, for example, may set up communication between the electronic device 101 and an external electronic device (e.g., a first electronic device 102, a second electronic device 104, or a server 106). In one example embodiment, the communication interface 170 may be connected with the network 162 or a network 164 through wireless or wired communication to communicate with the external electronic device.

In some embodiments, the first external electronic device 102 or the second external electronic device 104 may be a wearable device or an electronic device 101; for example, a mountable wearable device (e.g., an HMD). When the electronic device 101 is mounted in an HMD (e.g., the first external electronic device 102), the electronic device 101 may detect the mounting in the HMD and operate in a virtual reality mode. When the electronic device 101 is mounted in the first external electronic device 102 (e.g., the HMD), the electronic device 101 may communicate with the first external electronic device 102 through the communication interface 170. The electronic device 101 may be directly connected with the first external electronic device 102 to communicate with the electronic device 101 without involving a separate network.

In one or more embodiments, the wireless communication may use at least one of, for example, long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS).

In some embodiments, the network 162 may include at least one of communication networks, for example, a computer network (e.g., local area network (LAN) or wide area network (WAN)), Internet, or a telephone network.

In one or more embodiments, the first and second external electronic devices 102 and 104 may each be a device of the same or a different type as the electronic device 101. According to an embodiment, the server 106 may include a group of one or more servers. In some embodiments, all or some of the operations executed on the electronic device 101 may be executed on another or multiple other electronic devices (e.g., the first and second external electronic devices 102 and 104, server 106, etc.). According to one or more embodiments, when the electronic device 101 should perform some function or service automatically or at a request, the electronic device 101, instead of executing the function or service on its own, or additionally may request another device (e.g., first and second external electronic devices 102 and 104, server 106, etc.) to perform at least some functions associated therewith. The other electronic device (e.g., the first and second external electronic devices 102 and 104, server 106, etc.) may execute the requested functions or additional functions, and transfer a result of the execution to the electronic device 101. The electronic device 101 may provide a requested function or service by processing the received result as it is, or additionally further processing the receive result. To that end, for example, a cloud computing, distributed computing, or client-server computing technique may be used.

In some embodiments, although FIG. 1 shows that the electronic device 101 includes the communication interface 170 to communicate with the second external electronic device 104 or server 106 via the network 162, the electronic device 101 may be independently operated without a separate communication function.

In one or more embodiments, the server 106 may support driving the electronic device 101 by performing operations (or functions) implemented on the electronic device 101. For example, the server 106 may include an event processing server module (not shown) that may support the event processing module 180 implemented in the electronic device 101. In one example embodiment, the event processing server module may include at least one of the components of the event processing module 180 and perform (or instead perform) at least one of the operations (or functions) conducted by the event processing module 180. The event processing module 180 may process at least part of information obtained from other elements (e.g., the processor 120, the memory 130, the input/output interface 150, or the communication interface 170) and may provide the same to the user in various manners.

In some embodiments, although in FIG. 1 the event processing module 180 is shown to be a module separate from the processor 120, at least a portion of the event processing module 180 may be included or implemented in the processor 120 or at least one other module, or the overall function of the event processing module 180 may be included or implemented in the processor 120 shown or another processor. The event processing module 180 may perform operations in interoperation with at least one program 140 stored in the memory 130.

The exemplary embodiments described herein are not meant to be limiting and merely illustrative of various aspects of the invention. While exemplary embodiments may be indicated as applicable to a particular device category (e.g., HMDs, etc.) the processes and examples provided are not intended to be solely limited to the device category and can be broadly applicable to various device categories (e.g., appliances, computers, automobiles, etc.).

Figure 2:
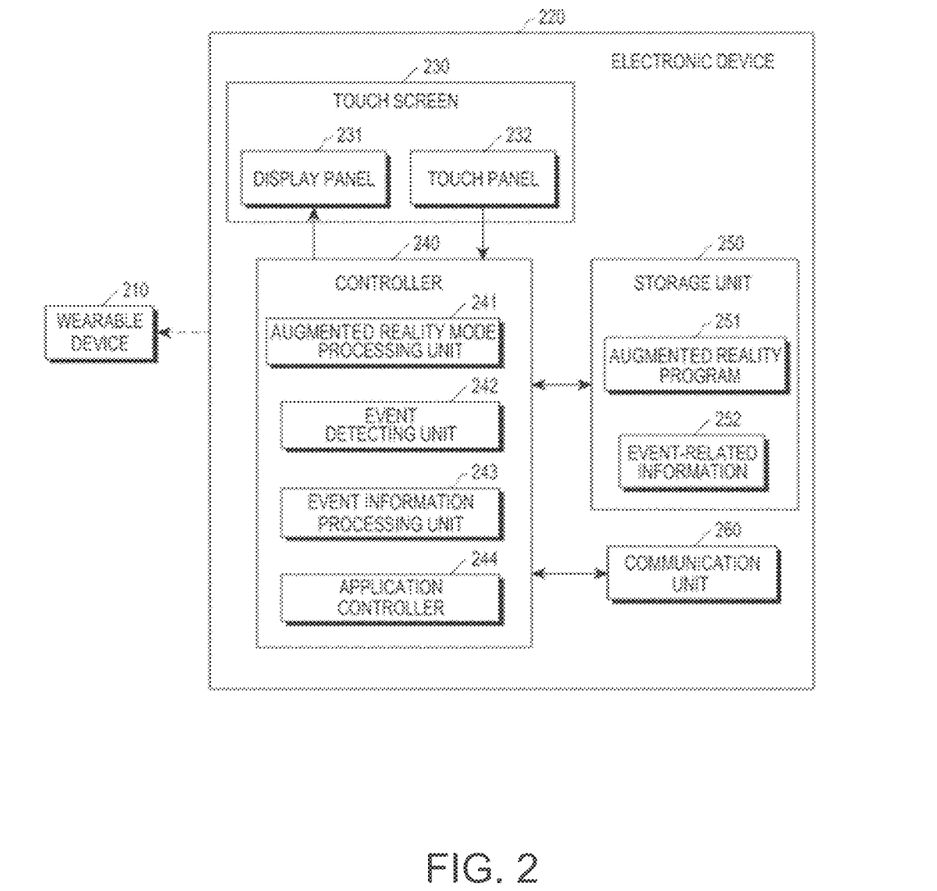
FIG. 2 is a block diagram illustrating an exemplary configuration of an electronic device, according to some embodiments.

FIG. 2 is a block diagram illustrating an exemplary configuration of an electronic device 220, according to some embodiments. In some embodiments, the electronic device 220 may include at least one display means. In the following description, the electronic device 220 may be a device primarily performing a display function or may denote an electronic device including at least one display means. For example, the electronic device 220 may be an electronic device (e.g., a smartphone, etc.) having a touchscreen 230.

In some embodiments, the electronic device 220 may include at least one of a touchscreen 230, a controller 240, a storage unit 250, or a communication unit 260. The touchscreen 230 may include a display panel 231 and/or a touch panel 232. The controller 240 may include at least one of an augmented reality mode processing unit 241, an event detecting unit 242, an event information processing unit 243, or an application controller 244. In one example embodiment, when the electronic device 220 is mounted in a wearable device 210 (e.g., a smart watch, a smart pendant, a personal video recorder or body camera, etc.), the electronic device 220 may operate as an HMD, and run an AR mode. Further, according to one or more embodiments, even when the electronic device 220 is not mounted in the wearable device 210, the electronic device 220 may run the AR mode according to the user's settings or running an AR mode related application. It should be noted that, although the electronic device 220 is set to be mounted in the wearable device 210 to run the AR mode, some embodiments are not limited thereto.

In one or more embodiments, when the electronic device 220 operates in the AR mode (e.g., the electronic device 220 is mounted in the wearable device 210 to operate in a head mounted theater (HMT) mode), two screens corresponding to the user's eyes (left eye and right eye) may be displayed through the display panel 231.

In some embodiments, when the electronic device 220 is operated in the AR mode, the controller 240 may perform control to process information related to an event generated (while operating in the AR mode) to handle the AR mode and display the processed information. According to one or more embodiments, when the event is generated while operating in the AR mode is an event related to running an application, the controller 240 may block the running of the application or process the application to operate as a background process or application. In one or more embodiments, the controller 240 may be implemented to perform various operations or functions as described below using at least one component of the electronic device 220 (e.g., the touchscreen 230, controller 240, or storage unit 250).

In one or more embodiments, when the electronic device 220 is mounted in the wearable device 210 or the AR mode is run according to a user's setting or as an AR mode-related application runs, the AR mode processing unit 241 may process various functions related to the operation of the AR mode. The AR mode processing unit 241 may load at least one AR program 251 stored in the storage unit 250 to perform various functions.

In some embodiments, the event determining unit 242 may determine an event generated while operated in the AR mode by the AR mode processing unit 241. Further, the event detecting unit 242 may determine whether there is information to be displayed on the screen in relation with an event generated while operating in the AR mode. Further, the event detecting unit 242 may determine an application to be run in relation with an event generated while operating in the AR mode. Various embodiments of an application related to the type of event are described below.

In one or more embodiments, the event information processing unit 243 may process the event-related information to be displayed on the screen to handle the AR mode when there is information to be displayed in relation with an event occurring while operating in the AR mode depending on the result of determination by the event detecting unit 242. Various methods for processing the event-related information may apply. For example, when a 3D image is implemented in the AR mode, the electronic device 220 may convert the event-related information to fit the 3D image. For example, event-related information being displayed in 2D may be converted into information corresponding to the left and right eye corresponding to the 3D image, and the converted information may be synthesized and displayed on the screen of the AR mode being currently run (e.g., two screens corresponding to the user's eyes (left eye and right eye) displayed through the display panel 231).

In some embodiments, when it is determined by the event detecting unit 242 that there is an application to be run in relation with the event occurring while operating in the AR mode, the application controller 244 may perform control to block the running of the application related to the event. According to one or more embodiments, when it is determined by the event detecting unit 242 that there is an application to be run in relation with the event occurring while operating in the AR mode, the application controller 244 may perform control so that the application is run in the background not to influence the running or screen display of the application corresponding to the AR mode when the event-related application runs.

In one or more embodiments, the storage unit 250 may store an AR program 251. The AR program 251 may be an application related to the AR mode operation of the electronic device 220. The storage unit 250 may store the event-related information 252. The event detecting unit 242 may reference the event-related information 252 stored in the storage unit 250 to determine whether the occurring event is displayed on the screen or identify information on the application to be run in relation with the occurring event.

In some embodiments, the wearable device 210 may be an electronic device including at least one function of the electronic device 101 (FIG. 1), and the wearable device 210 may be a wearable stand to which the electronic device 220 may be mounted. In case the wearable device 210 is an electronic device, when the electronic device 220 is mounted on the wearable device 210, various functions may be provided through the communication unit 260 of the electronic device 220. In one example embodiment, when the electronic device 220 is mounted on the wearable device 210, the electronic device 220 may detect whether to be mounted on the wearable device 210 for communication with the wearable device 210 and may determine whether to operate in the AR mode (or an HMT mode).

In one or more embodiments, upon failure to automatically determine whether the electronic device 220 is mounted when the communication unit 260 is mounted on the wearable device 210, the user may apply various embodiments by running the AR program 251 or selecting the AR mode (or the HMT mode). According to some embodiments, when the wearable device 210 includes functions as the electronic device 101 (FIG. 1), it may be implemented to automatically determine whether the electronic device 220 is mounted on the wearable device 210 and to enable the running mode of the electronic device 220 to automatically switch to the AR mode (or the HMT mode).

In some embodiments, at least some functions of the controller 240 may be included in the event processing module 180 or processor 120 of the electronic device 101 shown in FIG. 1. The touchscreen 230 or display panel 231 shown in FIG. 2 may correspond to the display 160 of FIG. 1. The storage unit 250 shown in FIG. 2 may correspond to the memory 130 of FIG. 1.

In one or more embodiments, although in FIG. 2 the touchscreen 230 includes the display panel 231 and the touch panel 232, the display panel 231 or the touch panel 232 may also be provided as a separate panel rather than being in a single touchscreen 230. Further, according to some embodiments, the electronic device 220 may include the display panel 231, but exclude the touch panel 232.

In some embodiments, the electronic device 220 may be denoted as a first device (or a first electronic device), and the wearable device 210 may be denoted as a second device (or a second electronic device) for ease of description.

In one or more embodiments, the electronic device 220 may include a display unit (not shown) displaying a screen corresponding to an AR mode, and the controller 240 performing control to detect an interrupt according to occurrence of at least one event, varied event-related information 252 related to the event in a form corresponding to the AR mode, and display the varied event-related information 252 on a screen running that corresponds to the AR mode.

In some embodiments, the event may include any one or more events selected from among a call reception event, a message reception event, an alarm notification, a scheduler notification, a wireless fidelity (Wi-Fi) connection, a WiFi disconnection, a low battery notification, a data permission or use restriction notification, a no application response notification, an abnormal application termination notification, etc.

In one or more embodiments, the electronic device 220 further includes the storage unit 250 storing the event-related information 252 when the event is not an event to be displayed in the AR mode, wherein the controller 240 may perform control operations to display the event-related information 252 stored in the storage unit 250 when the electronic device 220 switches from the AR mode into a see-through mode.

In some embodiments, the electronic device 220 may further include the storage unit 250 storing information regarding at least one event to be displayed in the AR mode.

In one or more embodiments, the event may include an instant message reception notification event.

In some embodiments, when the event is an event related to running at least one application, the controller 240 may perform control operations to block running of the application according to occurrence of the event.

In one or more embodiments, the controller 240 may perform control to run the blocked application when a screen mode of the electronic device 220 switches from the AR mode into a see-through mode.

In some embodiments, when the event is an event related to running at least one application, the controller 240 may perform control to enable the application according to the occurrence of the event to be run on a background of a screen in the AR mode.

In one or more embodiments, when the electronic device 220 is connected with the wearable device 210, the controller 240 may perform control operations to run the AR mode.

In some embodiments, the controller 240 may enable the event-related information 252 to be arranged and processed to be displayed in a 3D space of the AR mode screen being displayed on a current screen.

In one or more embodiments, the electronic device may include additional sensors such as one or more red, green, blue (RGB) cameras, direct vision standard (DVS) cameras, 360 degree cameras, or a combination thereof.

Figure 3:
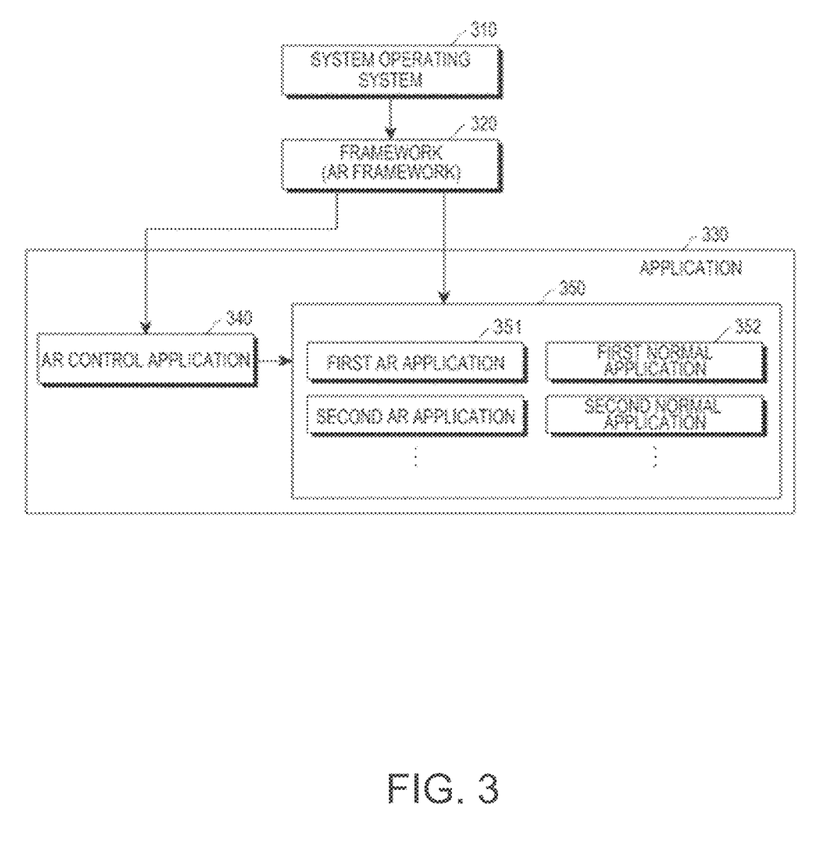
FIG. 3 is a block diagram illustrating a program module, according to some embodiments.

FIG. 3 is a block diagram illustrating a program module, according to some embodiments. Referring to FIG. 3, in some embodiments, the program module may include a system operating system (OS) 310, a framework (AR framework) 320 and applications 330. In one or more embodiments, system operating system 310 may include at least one system resource manager or at least one device driver. The system resource manager may perform, for example, control, allocation, or recovery of system resources, and the system resource manager may include at least one manager, such as a process manager, a memory manager, or a file system manager. The device driver may include at least one driver, such as, for example, a display driver, a camera driver, a BLUETOOTH® driver, a shared memory driver, a USB driver, a keypad driver, a WiFi driver, an audio driver, or an inter-process communication (IPC) driver.

In some embodiments, the framework 320 (e.g., middleware) may provide, for example, functions commonly required for an application or provide the application with various functions through an API to allow the application to efficiently use limited system resources inside an electronic device (e.g., electronic device 220).

In one or more embodiments, the AR framework included in the framework 320 may control functions related to AR mode operations on the electronic device. For example, according to running of an AR mode operation, the AR framework 320 may control at least one AR application 351 (e.g., a first AR application 351, a second AR application 351, etc.) related to AR among applications 330 to provide the AR mode on the electronic device.

In some embodiments, the applications 330 may include a plurality of applications and may include at least one AR application 351 running in the AR mode and at least one normal application 352 running in a normal mode, but not the AR mode.

In one or more embodiments, the applications 330 may further include an AR control application 340. An operation of the at least one AR application 351 and/or at least one normal application 352 may be controlled under the control of the AR control application 340.

In some embodiments, when at least one event occurs while the electronic device operates in the AR mode, the system OS 310 may notify the framework 320 (e.g., the AR framework) of occurrence of the event.

In one or more embodiments, the framework 320 may control the running of the normal application 352 so that event-related information 252 (FIG. 2) may be displayed on the screen for the event occurring in the normal mode, but not in the AR mode. When there is an application to be run in relation with the event occurring in the normal mode, the framework 320 may perform control operations to run at least one normal application 352.

In some embodiments, when an event occurs while operating in the AR mode, the framework 320 (e.g., the AR framework) may block the operation of at least one normal application 352 to display the information related to the occurring event. The framework 320 may provide the event occurring while operating in the AR mode to the AR control application 340.

In one or more embodiments, the AR control application 340 may process the information related to the event occurring while operating in the AR mode to handle the AR mode. For example, 2D planar event-related information may be processed into 3D information.

In some embodiments, the AR control application 340 may control at least one AR application 351 currently running and may perform control operations to synthesize the processed event-related information with the running screen by the AR application 351 and display the result.

In one or more embodiments, when an event occurs while operating in the AR mode, the framework 320 may perform control operations to block the running of at least one normal application 352 related to the occurring event.

In some embodiments, when an event occurs while operating in the AR mode, the framework 320 may perform control operations to temporarily block the running of at least one normal application 352 related to the occurring event, and when the AR mode terminates, to run the blocked normal application 352.

In one or more embodiments, when an event occurs while operating in the AR mode, the framework 320 may control the running of at least one normal application 352 related to the occurring event so that the at least one normal application 352 related to the event operates on the background so as not to influence the screen by the AR application 351 currently running.

The embodiments described in connection with FIG. 3 are examples for implementations in the form of a program, and some embodiments are not limited thereto and rather may be implemented in other various forms. Further, while the embodiments described in connection with FIG. 3 references AR, it may be applied to other scenarios such as virtual reality (VR), mixed reality (MR), etc. In such embodiments, the AR portions or components may be utilized to enable the VR or MR aspects. Collectively the various reality scenarios may be referenced herein as extended reality (XR).

Note that 2D to 3D image re-projection (also referred to as space-warp) is important to make XR pipelines maintain certain frame rates. In order to offload to a rendering device, space-warp may be used to generate new frames based on a reference frame with predicted head poses instead of rendering them. It has been found that space-warp may produce artifacts when the pixels in the reference frame are not available such as the pixels in occlusion areas. These artifacts are referred to as holes. Some embodiments described herein address obtaining a smooth view in XR pipelines, through estimation of these unavailable pixels to fill the holes.

Figure 4A:
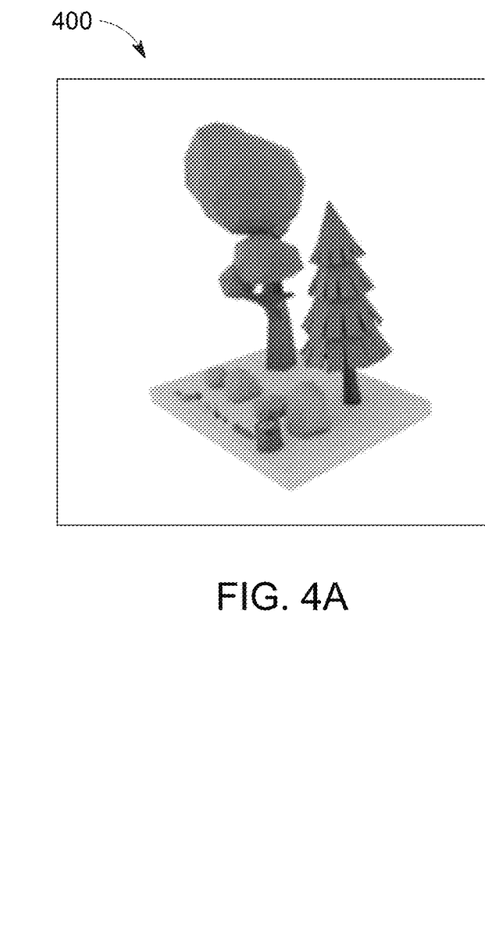
FIGS. 4A-C illustrates examples of a reference image, a depth map and 3D re-projected image.
Figure 4B:
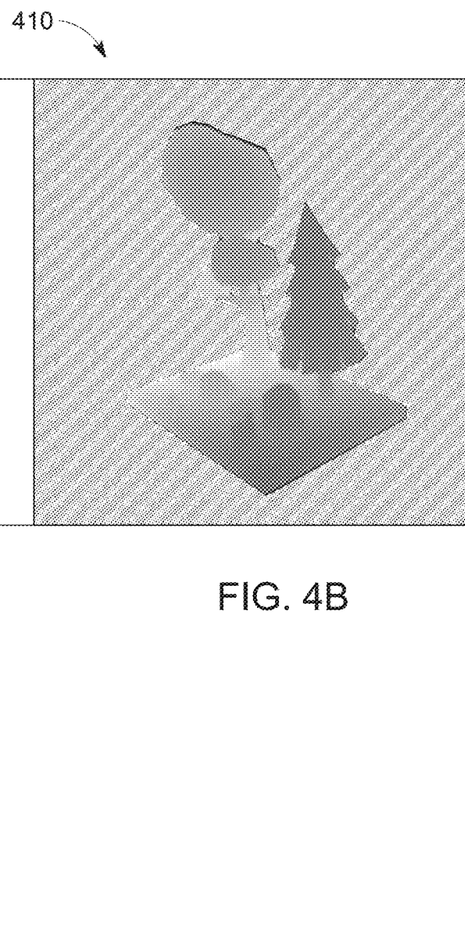
Figure 4C:
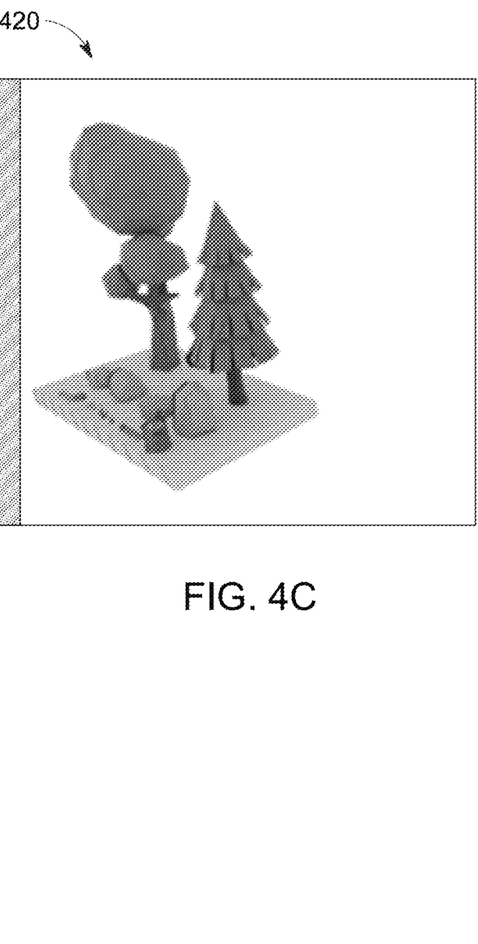

FIGS. 4A-C illustrates examples of a reference image, a depth map and 3D re-projected image. As indicated above, space-warp generates an image by re-projecting a reference image with a corresponding depth map and a predicted head pose. Through re-projection of the 2D reference image to a 3D space, holes may be created when pixels are not available in the reference image. Image 400 in FIG. 4A is a reference image. Image 410 in FIG. 4B is a depth map related to image 400. Image 420 of FIG. 4C shows a 3D re-projected image. From image 420, it can be seen that there are some holes which pixel values are missing (pixels in black).

Figure 5A:
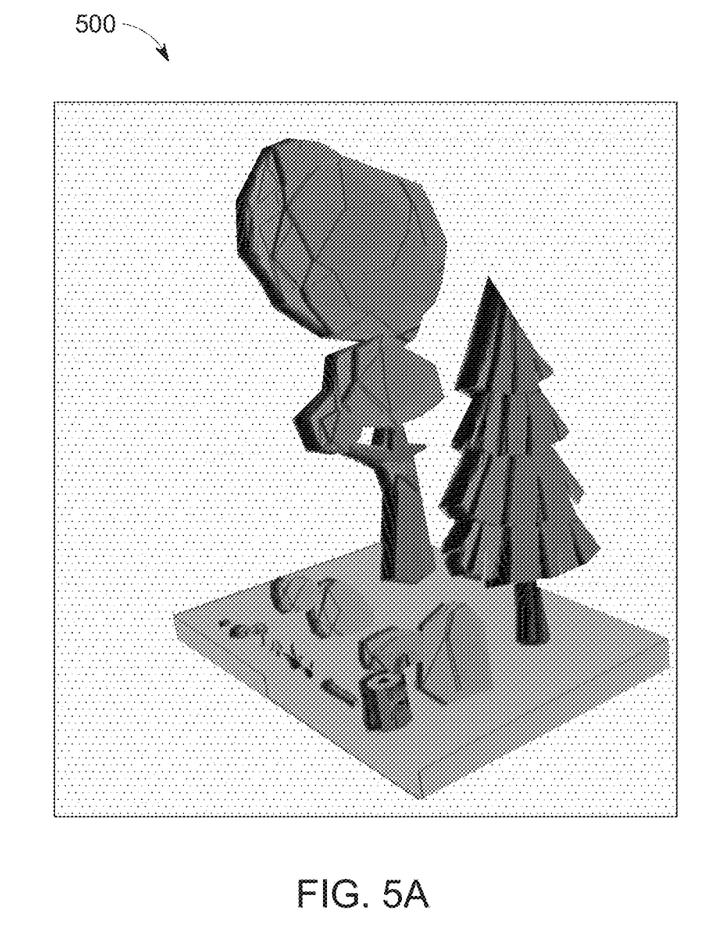
FIGS. 5A-B illustrate two additional examples of images with large holes generated by 2D to 3D image re-projection.
Figure 5B:
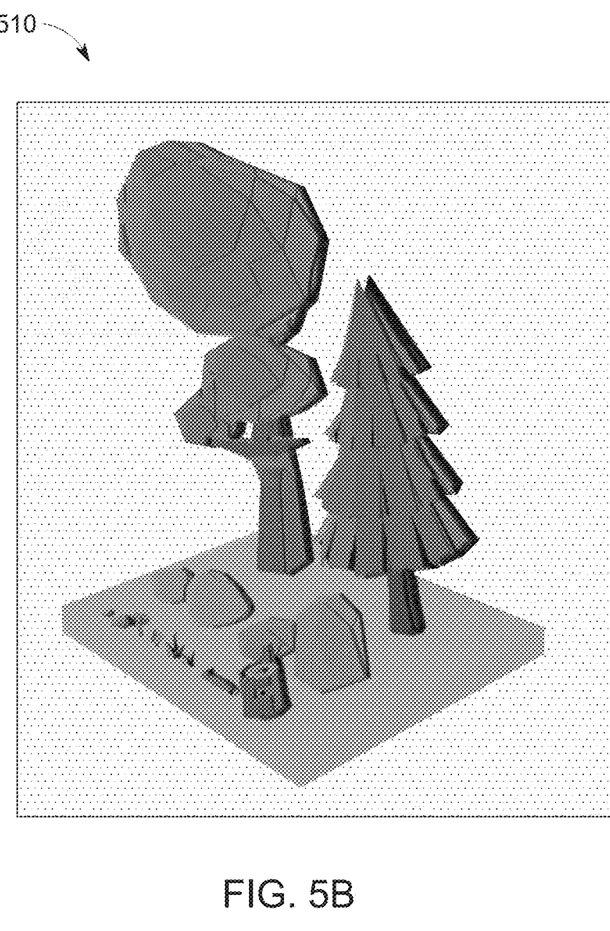

FIGS. 5A-B illustrate two additional examples of images (example image 500 and example image 510) with large holes generated by 2D to 3D image re-projection. As described above, a hole is created during 3D re-projection when pixels in a reference image are not available such as occluded pixels, which may be viewed after the reference image is re-projected with certain head poses. The embodiments described herein estimate these pixels by populating neighboring pixels with depth information and a corresponding camera model.

It has been found that intensities of pixels are similar if their depth values are similar in their neighborhood. Based on this premise, some embodiments create a camera model and compute 3D poses with the depth map. One or more embodiments build an optimization model with the intensity differences between the current considered pixel and the weighted average of intensities in the considered pixel's neighboring pixels. The weight may be computed by 3D poses and spatial information of the neighboring pixels. Since both 3D pose information and spatial information are used in weight computation, two aspects can be accounted for through optimization. On one hand, embodiments may populate intensities of neighboring pixels to the considered pixel. On the other hand, some embodiments may also preserve edges of the objects in the images. After solving this optimization problem, embodiments may obtain the pixel intensities in the holes.

In some embodiments, after obtaining pixel intensities of the holes, estimations of color elements with a pixel intensity guide may be determined. One or more embodiments may compute color elements at the considered pixel with intensities in the considered pixel's neighborhood. The computation of color elements may be based on using pixels which have similar intensities having similar colors. Some embodiments may use an optimization model with color differences between the current considered pixel and the weighted average of colors in the current considered pixel's neighboring pixels. The weight may be computed by intensities and spatial information of the neighboring pixels. After solving this optimization, one or more embodiments may obtain pixel color elements in the holes.

One or more embodiments may create an approach for propagating intensities of image pixels with a depth guide in their neighborhood based on pixels, which have similar depths and similar intensities in their neighborhoods. Some embodiments may create an approach for propagating colors of image pixels with an intensity guide in their neighborhood based on pixels that have similar intensities have similar colors in their neighborhoods. One or more embodiments may create approaches for computing weights based on the depth guide for intensity propagation and the intensity guide for color propagation.

Figure 6:
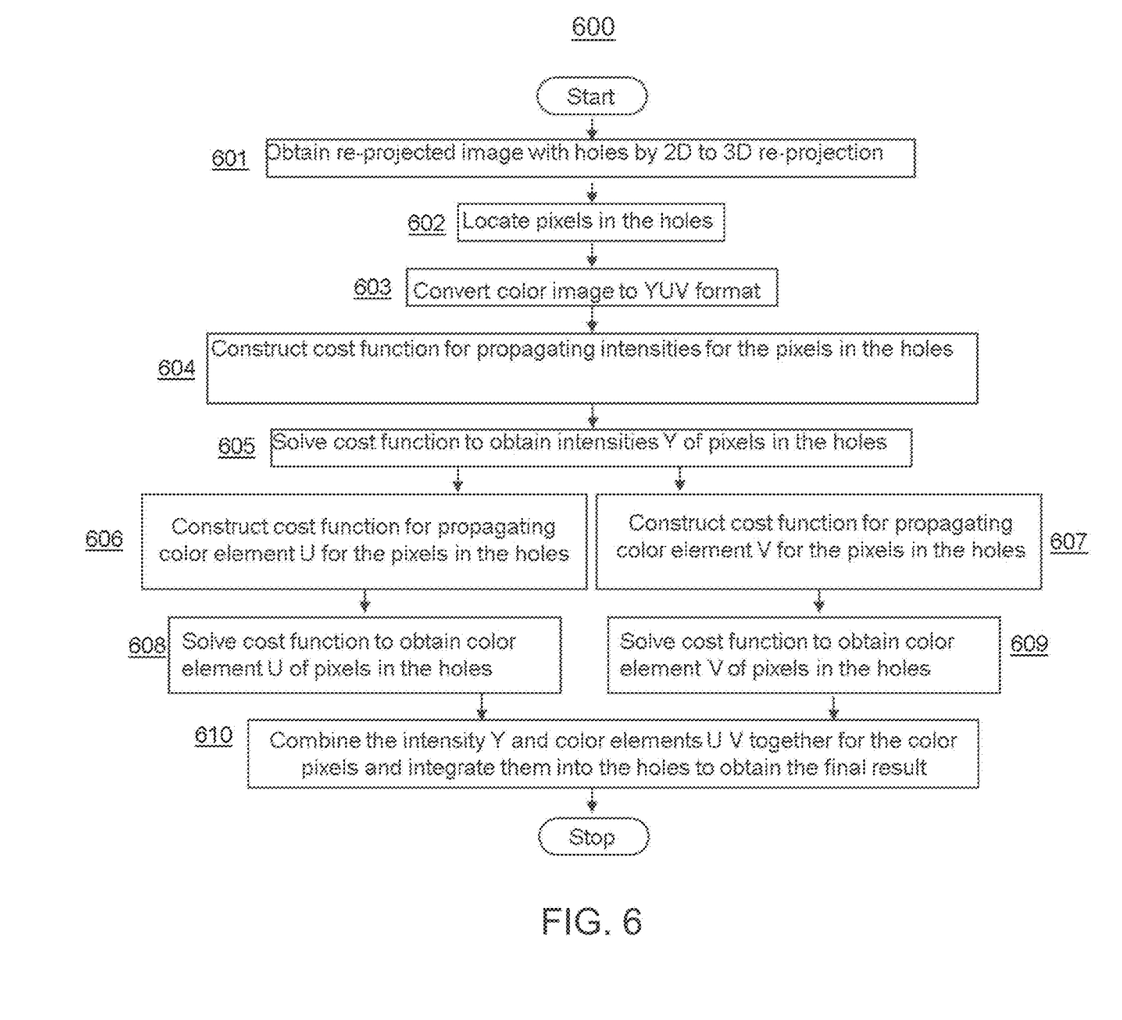
FIG. 6 illustrates an exemplary flow diagram, according to some embodiments.

FIG. 6 illustrates an exemplary flow diagram 600, according to some embodiments. The flow diagram 600 shows an exemplary approach for depth guided hole filling. As an example for ease of description, YUV is used herein as a color image format for an embodiment in which Y is an intensity element, and UV are color elements. Some embodiments may estimate pixels which miss intensities with a depth guide.

In one or more embodiments, once the flow diagram 600 starts, in block 601 processing obtains a re-projected image with holes by 2D to 3D re-projection. In block 602, processing locates pixels in the holes. In block 603, a color image is converted to the YUV format. In block 604, a cost function is constructed for propagating intensities for the pixels in the holes. In block 605, the cost function generated in block 604 is solved to obtain intensities Y of pixels in the holes.

In some embodiments, intensity element recovery may be performed by the following.

$$F(Y) = \sum_p \left( Y(p) - \sum_{q \in N(p)} W_{pq}^Y(D(p), D(q), p, q) Y(q) \right)^2 \quad (1)$$

where
Y(p) is the intensity at pixel p;
Y(q) is the intensity at pixel q;
N(p) is the neighborhood of pixel p;
q is the neighborhood pixel of pixel p;
$W_{pq}^Y$ is the weight created with neighborhood pixels, $$W_{pq}^{Yd}(D(p), D(q)) = C_d^Y e^{-(D(p)-D(q))^2/2\sigma_{Yd}^2} \quad (2)$$

$C_d^Y$ is a constant;
D(p) is the depth at pixel p;
D(q) is the depth at pixel q;
$\sigma_{Yd}$ is variance of the depths in a window around p;

$$W_{pq}^{Ys}(p, q) = C_s^Y e^{-\|p-q\|/2\sigma_{Ys}^2} \quad (3)$$

$C_s^Y$ is a constant;
$\sigma_{Ys}$ is variance of spatial positions in a window around p, which refers to geometric spread;

$$W_{pq}^Y = W_{pq}^{Yd} W_{pq}^{Ys} \quad (4)$$

In one or more embodiments, in block 606 processing constructs a cost function for propagating color element U for the pixels in the holes. In block 607, a cost function is constructed for propagating the color element V for the pixels in the holes. In block 608, the cost function constructed in block 606 is solved to obtain the color element U of pixels in the holes.

In some embodiments, color element U recovery may be performed by the following.

$$F(U) = \sum_p \left( U(p) - \sum_{q \in N(p)} W_{pq}^U(Y(p), Y(q), p, q) U(q) \right)^2 \quad (5)$$

where
U(p) is the color element U at pixel p;
U(q) is the color element U at pixel q;
N(p) is the neighborhood of pixel p;
q is the neighborhood pixel of pixel p;
$W_{pq}^U$ is the weight created with neighborhood pixels, $$W_{pq}^{Ud}(Y(p), Y(q)) = C_d^Y e^{-(Y(p)-Y(q))^2/2\sigma_{Ud}^2} \quad (6)$$

$C_d^U$ is a constant;
Y(p) is the intensity at pixel p;
Y(q) is the intensity at pixel p;
$\sigma_{Ud}$ is variance of the intensities in a window around p;

$$W_{pq}^{Us}(p, q) = C_s^U e^{-\|p-q\|/2\sigma_{Us}^2} \quad (7)$$

$C_s^U$ is a constant;
$\sigma_{Us}$ is variance of spatial positions, which refers to geometric spread;

$$W_{pq}^U = W_{pq}^{Ud} W_{pq}^{Us} \quad (8)$$

In one or more embodiments, in block 609, the cost function constructed in block 607 is solved to obtain the color element V of pixels in the holes.

In some embodiments, color element V recovery may be performed by the following.

$$F(V) = \sum_p \left( V(p) - \sum_{q \in N(p)} W^V_{pq}(Y(p), Y(q), p, q) V(q) \right)^2 \quad (9)$$

where
V(p) is the color element V at pixel p;
V(q) is the color element V at pixel q;
N(p) is the neighborhood of pixel p;
q is the neighborhood pixel of pixel p;
$W_{pq}^V$ is the weight created with neighborhood pixels, $$W^{Vd}_{pq}(Y(p), Y(q)) = C^V_d e^{-(Y(p)-Y(q))^2/2\sigma^2_{Vd}} \quad (10)$$

$C_d^V$ is a constant;
Y(p) is the intensity at pixel p;
Y(q) is the intensity at pixel p;
$\sigma_{Vd}$ is variance of the intensities in a window around p;

$$W^{Vs}_{pq}(p, q) = C^V_s e^{-\|p-q\|/2\sigma^2_{Vs}} \quad (11)$$

$C_s^V$ is a constant;
$\sigma_{Vs}$ is variance of spatial positions, which refers to geometric spread;

$$W^V_{pq} = W^{Vd}_{pq} W^{Vs}_{pq} \quad (12)$$

In one or more embodiments, in block 610 processing includes combining the intensity Y and color elements U and V together for the color pixels, and integrate them into the holes to obtain the final result.

In some embodiments, obtaining intensity and color elements may be performed by the following.

Equation (1) is minimized to obtain the intensity of pixel p, $$Y(p) \rightarrow \min F(Y), \quad (13)$$

equation (5) is minimized to obtain the color element U of pixel p, $$U(p) \rightarrow \min F(U), \quad (14)$$

equation (9) is minimized to obtain the color element V of pixel p, $$V(p) \rightarrow \min F(V), \quad (15)$$

Figure 7A:
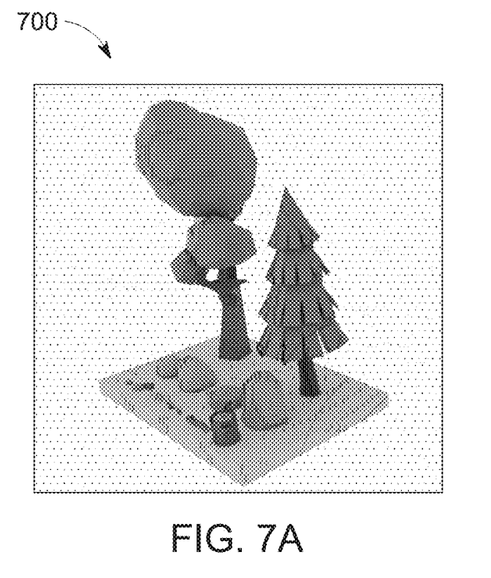
FIG. 7A shows an example image with holes.
Figure 7B:
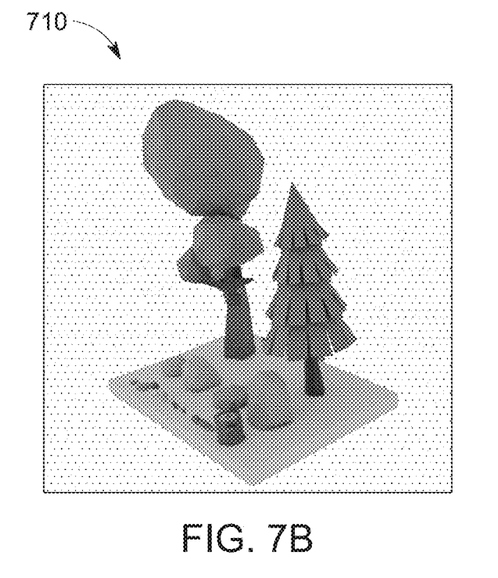
FIG. 7B shows an image where the example image from FIG. 7A is shown with the holes filled, according to some embodiments.
Figure 8A:
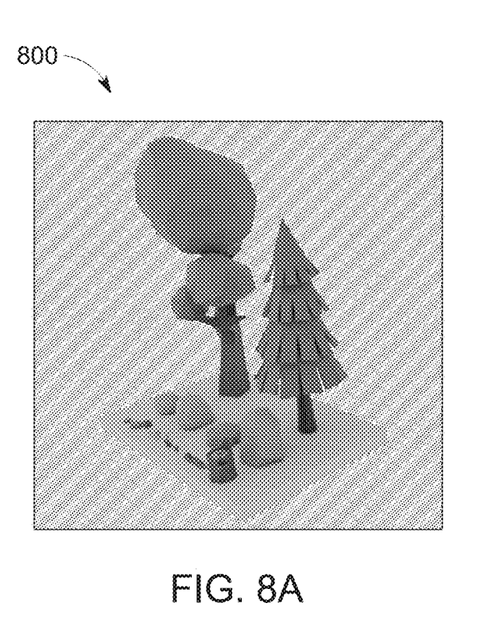
FIG. 8A-B show example result images after hole filling, according to some embodiments.
Figure 8B:
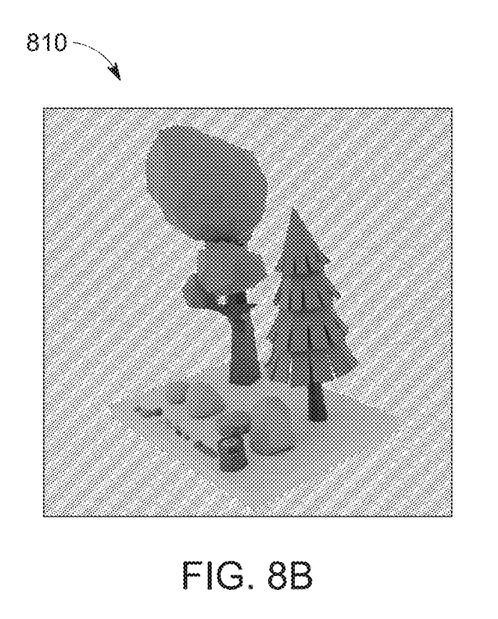

FIG. 7A shows an example image 700 with holes. FIG. 7B shows an image 710 where the example image from FIG. 7A is shown with the holes filled, according to some embodiments. FIGS. 8A-B show example result images 800 and 810 after hole filling, according to some embodiments. It should be noted that the illustrated regions of the figures are merely examples. Also, it should be noted that although FIGS. 7A-B and 8A-B are shown in two dimensions, the zones are often three dimensional. It also should be noted that for clarity and ease of illustration, the figures are not necessarily made to scale.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though embodiments have been described with reference to certain versions thereof; however, other versions are possible. Therefore, the spirit and scope of the embodiments should not be limited to the description of the preferred versions contained herein.

What is claimed is:

1. An electronic device that reprojects two-dimensional (2D) images to three-dimensional (3D) images, comprising:
a memory configured to store instructions; and
a processor configured to execute the instructions to:
propagate an intensity for at least one pixel of an image based on a first function and a depth guide of neighboring pixels of the at least one pixel, wherein the at least one pixel is considered a hole during 2D to 3D image reprojection;
propagate a color for the at least one pixel based on at least a second function and an intensity guide of the neighboring pixels of the at least one pixel; and
compute at least one weight for the at least one pixel based on the intensity and color propagation.

2. The electronic device of claim 1, wherein the depth guide is based on neighboring pixels with similar depths having similar intensities.

3. The electronic device of claim 1, wherein the intensity guide is based on neighboring pixels with similar intensities having similar colors.

4. The electronic device of claim 1, wherein the processor is further configured to execute the instructions to:
integrate color information, for the at least one pixel based on the at least one weight, into the 2D to 3D image reprojection.

5. The electronic device of claim 1, wherein:
the processor is further configured to execute the instructions to:
combining the intensity of the at least one pixel and color elements of the color of the at least one pixel together for color pixels of the image, wherein the image is a 2D image; and the propagation of the color for the at least one pixel is further based on a third function.

6. The electronic device of claim 5, wherein:
the processor is further configured to execute the instructions to:
   integrate the combined intensity of the at least one pixel and the color elements of the color of the at least one pixel into holes of an interim 3D image of the 2D image to obtain a final reprojected 3D image;
the first function is minimized to obtain the intensity of the at least one pixel;
the second function is minimized to obtain a first color element of the color of at least one pixel; and
the third function is minimized to obtain a second color element of the color of the at least one pixel.

7. The electronic device of claim 1, wherein a hole is a pixel without information from a reference image being reprojected in 3D, and the electronic device comprises an augmented reality (AR) device or an extended reality (XR) device.

8. The electronic device of claim 7, wherein the electronic device is a head mounted device (HMD) connected with a wireless companion electronic device.

9. A method of using a computing device that reprojects two-dimensional (2D) images to three-dimensional (3D) images, the method comprising:
   propagating, by the computing device, an intensity for at least one pixel of an image based on a first function and a depth guide of neighboring pixels of the at least one pixel, wherein the at least one pixel is considered a hole during 2D to 3D image reprojection;
   propagating, by the computing device, a color for the at least one pixel based on at least a second function and an intensity guide of the neighboring pixels of the at least one pixel; and
   computing, by the computing device, at least one weight for the at least one pixel based on the intensity and color propagation.

10. The method of claim 9, wherein the depth guide is based on neighboring pixels with similar depths having similar intensities.

11. The method of claim 9, wherein the intensity guide is based on neighboring pixels with similar intensities having similar colors.

12. The method of claim 9, wherein method further comprises:
   integrating, by the computing device, color information, for the at least one pixel based on the at least one weight, into the 2D to 3D image reprojection.

13. The method of claim 9, wherein:
the method further comprises:
   combining, by the computing device, the intensity of the at least one pixel and color elements of the color of the at least one pixel together for color pixels of the image, wherein the image is a 2D image; and
   integrating, by the computing device, the combined intensity of the at least one pixel and the color elements of the color of the at least one pixel into holes of an interim 3D image of the 2D image to obtain a final reprojected 3D image;
the propagation of the color for the at least one pixel is further based on a third function;
the first function is minimized to obtain the intensity of the at least one pixel;
the second function is minimized to obtain a first color element of the color of the at least one pixel; and
the third function is minimized to obtain a second color element of the color of the at least one pixel.

14. The method of claim 9, wherein a hole is a pixel without information from a reference image being reprojected in 3D, and the computing device comprises an augmented reality (AR) device or an extended reality (XR) device.

15. The method of claim 14, wherein the computing device is a head mounted device (HMD) connected with a wireless companion electronic device.

16. A non-transitory processor-readable medium that includes a program that when executed by a processor performing a method comprising:
   propagating an intensity for at least one pixel of an image based on a first function and a depth guide of neighboring pixels of the at least one pixel, wherein the at least one pixel is considered a hole during two-dimensional (2D) to three-dimensional (3D) image reprojection;
   propagating a color for the at least one pixel based on at least a second function and an intensity guide of the neighboring pixels of the at least one pixel; and
   computing at least one weight for the at least one pixel based on the intensity and color propagation.

17. The non-transitory processor-readable medium of claim 16, wherein:
the depth guide is based on neighboring pixels with similar depths having similar intensities; and
the intensity guide is based on neighboring pixels with similar intensities having similar colors.

18. The non-transitory processor-readable medium of claim 16, wherein the method further comprises:
   integrating color information, for the at least one pixel based on the at least one weight, into the 2D to 3D image reprojection.

19. The non-transitory processor-readable medium of claim 16, wherein:
the method further comprises:
   combining the intensity of the at least one pixel and color elements of the color of the at least one pixel together for color pixels of the image, wherein the image is a 2D image; and
   integrating the combined intensity of the at least one pixel and the color elements of the color of the at least one pixel into holes of an interim 3D image of the 2D image to obtain a final reprojected 3D image;
the propagation of the color for the at least one pixel is further based on a third function;
the first function is minimized to obtain the intensity of the at least one pixel;
the second function is minimized to obtain a first color element of the color of the at least one pixel; and
the third function is minimized to obtain a second color element of the color of the at least one pixel.

20. The non-transitory processor-readable medium of claim 16, wherein a hole is a pixel without information from a reference image being reprojected in 3D, and the computing device comprises an augmented reality (AR) device, an extended reality (XR) device, or a head mounted device (HMD) connected with a wireless companion electronic device.

* * * * *